United States Patent [19]
Thompson et al.

[11] Patent Number: 5,674,344
[45] Date of Patent: Oct. 7, 1997

[54] LOOSE FILL PACKAGING MATERIAL

[75] Inventors: Neil Anthony Thompson, North Altona; Frederick Walter Van Den Hout, Donvale, both of Australia

[73] Assignee: Amcor Limited, Australia

[21] Appl. No.: 525,670

[22] PCT Filed: Mar. 11, 1994

[86] PCT No.: PCT/AU94/00113

§ 371 Date: Nov. 9, 1995

§ 102(e) Date: Nov. 9, 1995

[87] PCT Pub. No.: WO94/21534

PCT Pub. Date: Sep. 29, 1994

[30] Foreign Application Priority Data

Mar. 18, 1993 [AU] Australia ................. PL7868

[51] Int. Cl.⁶ ............... B32B 31/00; B65B 1/00; B31B 1/14
[52] U.S. Cl. ............. 156/250; 264/138; 53/266.1; 53/285; 53/467; 493/224; 493/340; 493/361; 493/967; 206/584; 206/814
[58] Field of Search ................. 428/156, 182, 428/184; 493/967, 224, 340, 361; 53/266.1, 285, 300, 467; 206/775, 584, 814; 156/250; 264/138

[56] References Cited

U.S. PATENT DOCUMENTS

| | | | |
|---|---|---|---|
| 2,045,733 | 6/1936 | Spatford | 428/184 |
| 3,743,568 | 7/1973 | De Wolf | 428/184 |
| 3,785,914 | 1/1974 | Fing | 428/184 |
| 3,961,119 | 6/1976 | Thomas | 428/184 |
| 5,188,880 | 2/1993 | Tether | 428/120 |

FOREIGN PATENT DOCUMENTS

| | | |
|---|---|---|
| 75948/81 | 4/1982 | Australia . |
| 0457162A1 | 11/1991 | European Pat. Off. . |
| WO 90/08709 | 8/1990 | Germany . |
| 1722877-A1 | 3/1992 | U.S.S.R. . |

*Primary Examiner*—Donald Loney
*Attorney, Agent, or Firm*—Nixon & Vanderhye P.C.

[57] ABSTRACT

Loose fill packaging material consists of elements (21) having a central liner (15) and a corrugated medium (17) on both sides of the liner. The element is made from fibreboard material. A method is disclosed of making the element by securing together the liner of a folded sheet of single faced corrugated fibreboard or securing together the liners of two sheets.

12 Claims, 10 Drawing Sheets

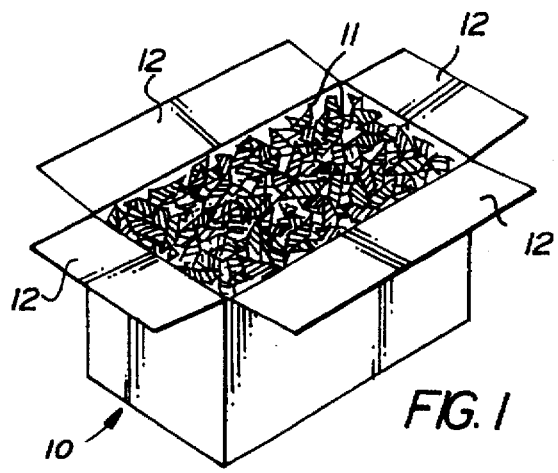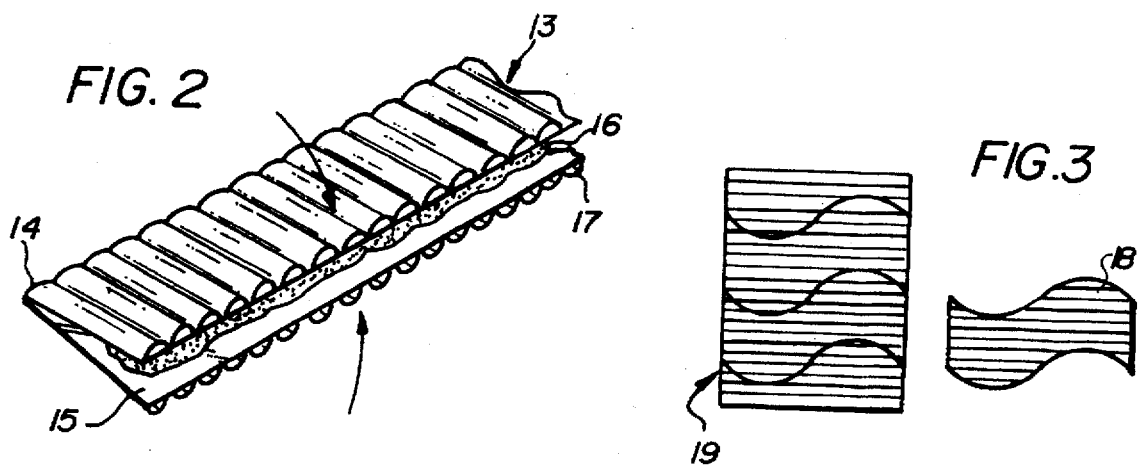

91cm Drop Height, 23 C, 50% R.H, 51mm Thick Cushion, Single and Multiple Impacts 61 cm Drop Height, 23 C, 92% R.H, 51mm Thick Cushion, Single and Multiple Impacts 76cm Drop Height, 23 C, 92% R.H, 51mm Thick Cushion, Single and Multiple Impacts 91cm Drop Height, 23 C, 92% R.H, 51mm Thick Cushion, Single and Multiple Impacts Comparison of 61cm Drop Heights at Standard and High Humidity Conditions for Single and Average of 2 to 5 Impacts Comparison of 91cm Drop Heights at Standard and High Humidity Conditions for Single and Average of 2 to 5 Impacts

LOOSE FILL PACKAGING MATERIAL

FIELD OF THE INVENTION

THIS INVENTION relates to a packaging material. In particular, the invention concerns a loose fill packaging material, which may be used in conjunction with an outer container for receiving the packaging material and the goods to be shipped.

BACKGROUND OF THE INVENTION

Loose fill packaging material is known and in one earlier proposal consisted of shredded fibreboard or paper. Typically, waste fibreboard or paper was used. The outer container was partially filled with the loose fill packaging material, the goods being shipped were then placed within the outer container and further loose fill packaging material was then deposited over the goods to fill the remainder of the outer container. After this, the container was sealed and was then ready for shipping.

The goods being packaged often consisted of bottles containing liquids and a plurality of like containers were usually packed on a pallet for shipment. If the liquid from one of the containers should leak it was not unusual for all of the containers on that pallet to be damaged in some way.

Packaging of this type did afford a limited degree of moisture absorption but the nature of the packaging was such that it tended to settle or become compressed during shipping and its impact resistance was therefor greatly impaired.

Another type of known loose fill packaging material was made from beads or other shapes of polystyrene foam. Such material provided as satisfactory degree of impact resistance but could not be recycled and offered no absorptive properties. In addition, polystyrene is not particularly environment friendly.

Loose fill protective packaging, both for cushioning and void fill, plays an increasingly important role in the packaging and distribution industries. These loose fill protective products have been made from a variety of materials, namely plastic, paper, popcorn, gelatine, pulp and starch based materials.

The elements of an entire "packaging system" for audio equipment for example would typically be a corrugated fibreboard shipper expanded polystyrene chips/beads or pieces an adhesive (to bind the styrene chips to prevent settling)

a high density polyethylene bag or sheet of film to separate the adhesive covered EPS from the product.

This system was composed of at least three different packaging materials (ignoring the adhesive) derived from cellulose and oil. Although all were ultimately recyclable, the present consumer waste collection scheme does not lend itself easily to the complete recycling of this system and ready disposal.

It is an object of the present invention to provide a loose fill packaging material, which at lease minimises the disadvantages referred to above.

DISCLOSURE OF THE INVENTION

According to one aspect the invention provides a loose fill packaging material consisting of discrete elements having a liner of fibrous material having a corrugated fibrous material medium secured to each face.

It is preferred that the corrugated medium be either A, B or C flute although other flute sizes may also be used. It is preferred that the corrugated medium on each face of the liner be of the same flute size although this need not be the case.

The elements may be of any convenient peripheral shape. It is preferred that the elements be other than square or rectangular in shape since elements of such a shape exhibit a greater tendency to nest or stack together in the outer container rather than maintain a random relationship relative to each other. It is preferred that the elements be of a quadrilateral shape. Alternatively, the elements may have only two sides which are parallel and the remaining sides may be curved or of any other suitable shape.

As mentioned, there is at least one liner of fibreboard material. Depending upon the method used to make the elements there may be a double thickness liner which has a respective fluted medium on each outer face thereof.

The elements of the invention may be by securing two sheets of single faced corrugated fibreboard together so that the liners of each sheet are secured to one another. The resultant sheet may than be cut into strips of a desired width and elements cut from the strips to yield loose fill packaging material of the type discussed.

An alternative method to that mentioned above may be used for making elements according to an embodiment of the invention. A single faced corrugated fibreboard sheet may be cut into strips. The strips may be then creased longitudinally and folded over along the crease so that the liner is folded over onto itself. An adhesive is applied to the liner so that it adheres to itself. The strip is then cut into elements of the desired shape and size. Of course an adhesive need not be used and fasteners may be employed instead.

A further alternative may comprise producing a corrugated sheet having a single liner with a corrugated medium bonded to both faces thereof. This sheet may then be cut into strips and elements of the desired shape and size cut from the strips.

It should be appreciated that in the first two options discussed above equal quantities of material are used. The last alternative uses less fibreboard material end thus the elements so produced have a lower weight for the same cushioning performance as the elements of the first two options.

The loose fill packaging material of the invention may be made entirely from virgin or recycled fibreboard material, or from combinations of these. The made is able to absorb liquid and thus the contamination corrugated medium and the grade in grams per square meter (gsm) of the medium and the liner or liners may be chosen to allow the bulk density and the cushioning effects of the material to be varied to suit particular packaging circumstances. The packaging material of the invention may readily be recycled either on its own or with the outer container into which they may be deposited. The fibreboard material from which the packaging material is made is able to absorb liquid and thus the contamination problem mention above is eliminated or at least minimised.

BRIEF DESCRIPTION OF THE DRAWINGS

Particular preferred embodiments of the invention will now be described by way of example with reference to the drawings in which:

FIG. 1 shows a perspective view of an outer container filled with packaging material according to an embodiment of the invention;

FIG. 2 is a view useful in understanding one way in which the packaging material of the invention may be made;

FIGS. 3, 4 and 5 show alternative configurations for the elements which comprise the packaging material of the inventions;

DETAILED DESCRIPTION OF THE DRAWINGS

Figure 6:
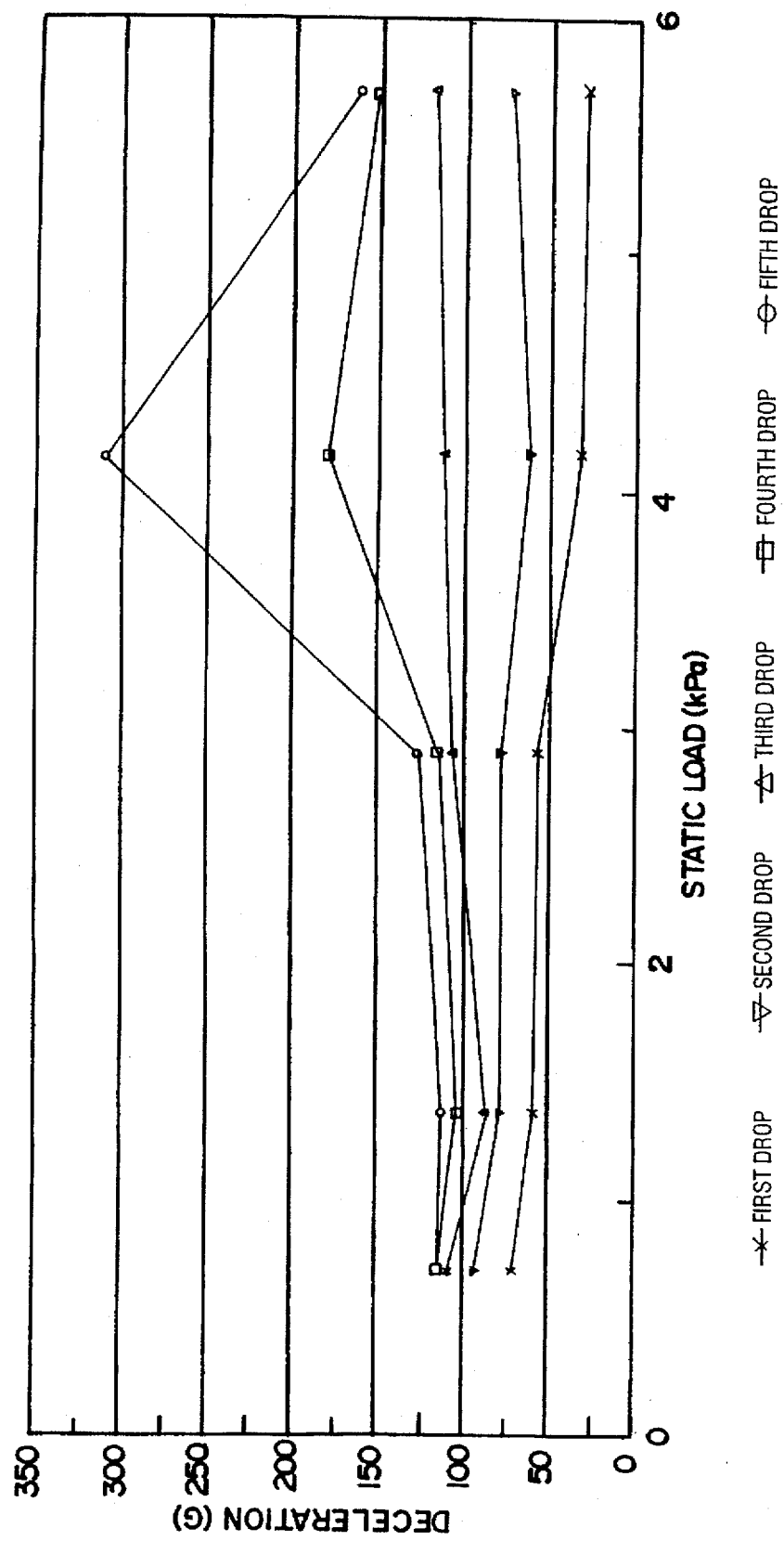
FIGS. 6 to 8 show results for a cushion thickness of 51 mm at 23° C., 50% relative humidity for 61 cm, 76 cm and 91 cm drop heights respectively.

In FIG. 1 an outer container 10 is shown. The container is filled with packaging material, consisting of randomly oriented elements 11 first deposited in the container 10 up to a predetermined level. The goods (not visible) being packaged are then placed within the container 10 and then the remainder of the container 10 is filled with the elements 11. Closure flaps 12 of the container 10 may then be sealed and the container is then ready to be shipped.

FIG. 2 shows a strip 13 of single faced corrugated fibreboard material cut from a sheet of such material. The strip is folded along crease line 14 with the liner 15 folded over onto itself. Adhesive 16 is used to cause the liner to adhere to itself with the corrugated medium 17 outermost. It is of course possible to produce a strip like that shown by starting with two sheets of single faced corrugated fibreboard material, gluing or otherwise securing the sheets back to back and then cutting the resultant sheet into strips from which the packaging material may be formed.

A further alternative may consist of producing a sheet of fibreboard material having a single liner with a corrugated medium bonded to both faces thereof. The packaging material of the invention may then be formed from that sheet.

The elements which comprise packing material of the invention may be cut from a strip 19 to achieve elements having the shape shown in FIG. 3. Two edges of the element 18 have a wavy profile while the other edges are parallel to one another. Such a shape assists in minimising nesting or stacking of the elements in the outer container provides for a relatively random orientation of the elements when placed within a container.

In the embodiment; of FIG. 4 the strip 20 is cut along inclined lines to produce elements 21 of a quadrilateral or parallelepiped shape. Once again, such a shape minimises nesting or stacking.

FIG. 5 shows a strip 22 which is cut into elements 23 having two curved edges end two parallel edges.

Tests have been conducted to establish the effectiveness of the packaging material of the invention. The tests were based on the Standard Test Methods for Transmitted Shock Characteristics of Foam in Place Cushioning Materials (ASTM 4168–88). This method was chosen as it allows the material to be evaluated in a way which closely resembles actual use of the material. The test procedure adopted was as follows:

A test block, constructed of plywood, was fitted with ballast weights which could be changed to vary the static load exerted by the base of the block on the packaging material. As the area of the base remained constant and the weights were accurately known, a series of static load points in the range 0.69 kPa to 5.52 kPa were chosen. The packaging material was placed in a corrugated container to a depth of 5 cm. An accelerometer was placed in it. The area surrounding the test block was then packed with the same material and the carton was sealed. The complete package was dropped up to five times and the process repeated changing:

the packaging material (new material was placed on the base, while the material on the top and the sides was re-used)

the corrugated container the ballast weights altering the static load the drop height, The corrugated container had internal dimensions of 305 mm×305 mm×305 mm. An RSC (Regular Slotted Container) was used made from 210 gsm Kraft liners with 140 gsm 100% recycled corrugated medium in C flute.

The packaging material used in the tests was made from single faced corrugated fibreboard which had been laminated to a lie piece of the same material by the liner facings. The papers used were 115 gsm for both the liner and the corrugated medium. The medium was A flute and the shape shown in FIG. 4 with the sides having a length of 28 mm, a width of 22 mm and a total length of 53 mm. The shape was chosen based on requirements for resisting or having minimal settling or nesting during use. The corrugations were also able interlock to some extent thus assisting in making the cushion more rigid and reducing migration of the material.

Two sets of conditions were used—50%±1% and 92%±2% relative humidity at 23°±0.5° C.

The equipment used in the tests consisted of:

Accelerometer range 0–1000 G piezoelectric type

Lansmont Test Partner (TM), Version 1.25 for data acquisition and analysis.

IBM 386 compatible PC

Free Fall Drop Tester, single arm type

The test jig as described

Hot melt adhesive to secure the accelerometer to the ballast weight.

Static loads of approximately 0.69, 1.38, 2.76, 4.14, and 5.52 kPa (0.1, 0.2, 0.4, 0.6, 0.8 psi respectively) were chosen. This range was used because it fits most products and incurs low creep of the material. The static load was determined by dividing the mass of the complete test jig by the area of the base of the test jig (0.0412 m$^2$).

Drop heights of 610 mm, 762 mm, 914 mm (24 in, 30 in, 36 in were used since most products likely to be packaged using this packaging material would be handled manually, therefore expecting accidental freefall drops of heights in this range. In addition, these heights are the most commonly used by cushioning manufacturers for producing cushion curves.

Each carton was dropped five successive times, with a one minute interval between each drop, as prescribed by ASTM 4168–88. The peak acceleration, velocity change on impact, and duration of the impact, were recorded and logged for each drop.

Duplicate samples were tested for each drop height and static load.

The bulk density of the corrugated packaging material tested was determined by filling a container of known volume with the material and recording the weight of the corrugated cushioning material. The result obtained was bulk density of 37.9 kg/m$^3$. Ten measurements were made the results were within 2% of the mean.

Of interest was the effectiveness of the packaging material to absorb shock. This attribute was studied by placing the test jig in a carton without any cushioning material, other than the corrugated carton itself. The carton was made of the same combination of liners, medium and flute profile and had nominal internal dimensions the same as the outer dimensions of the test jig. This then prevented any unrestrained movement of the block in the testing process. Table 1 shows the peak decelerations encountered and the conditions of the test, for a single drop.

TABLE 1

Impact on test jig, no cushioning material, single drop.

| Conditions (°C., % R.H) | Drop Height (mm) | Static Load* (kPa) | Max. Deceleration (G) |
|---|---|---|---|
| 23°, 92% | 610 | 2.83 | 329.4 |
| 23°, 92% | 762 | 0.76 | 264.3 |

*The static load was determined as the ratio between the mass of the test jig and its base area.

Settling or compression of the loose-fill packaging material occurred during the drops, and was evidenced by head space appearing in the top of the carton in all cases. This head space was measured and found to lie between 25 mm and 30 mm, after five successive drops, for all drop heights and all static loadings. Hence, there was a permanent loss of cushion thickness due to crushing of the flutes, as evidenced on examination after completion of a test sequence.

The force measured during impact was transformed into deceleration and the results plotted versus static load at the two relative humidities and three drop heights. Single impacts, followed successively by second, third, fourth and fifth impacts were recorded.

Figure 7:
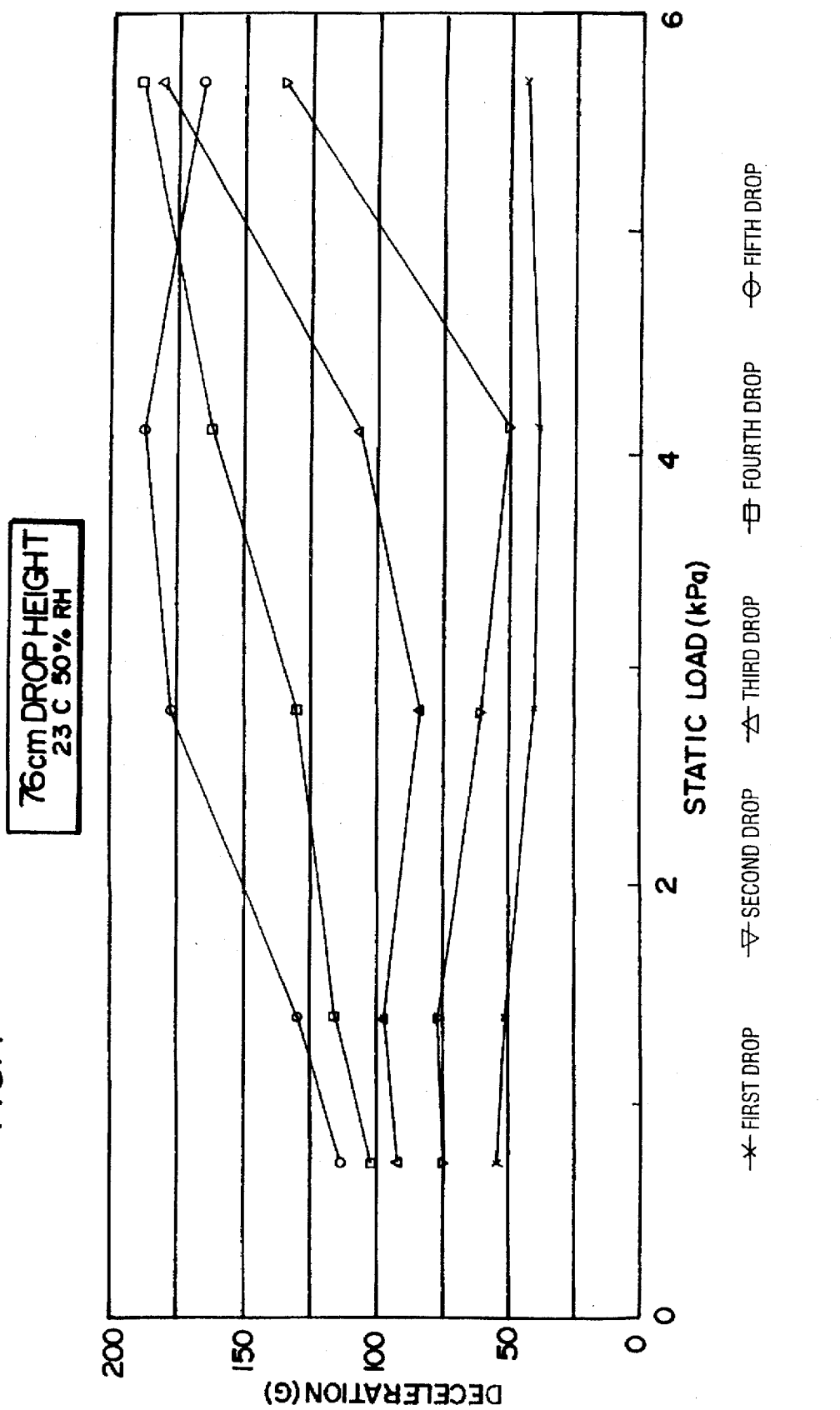
Figure 8:
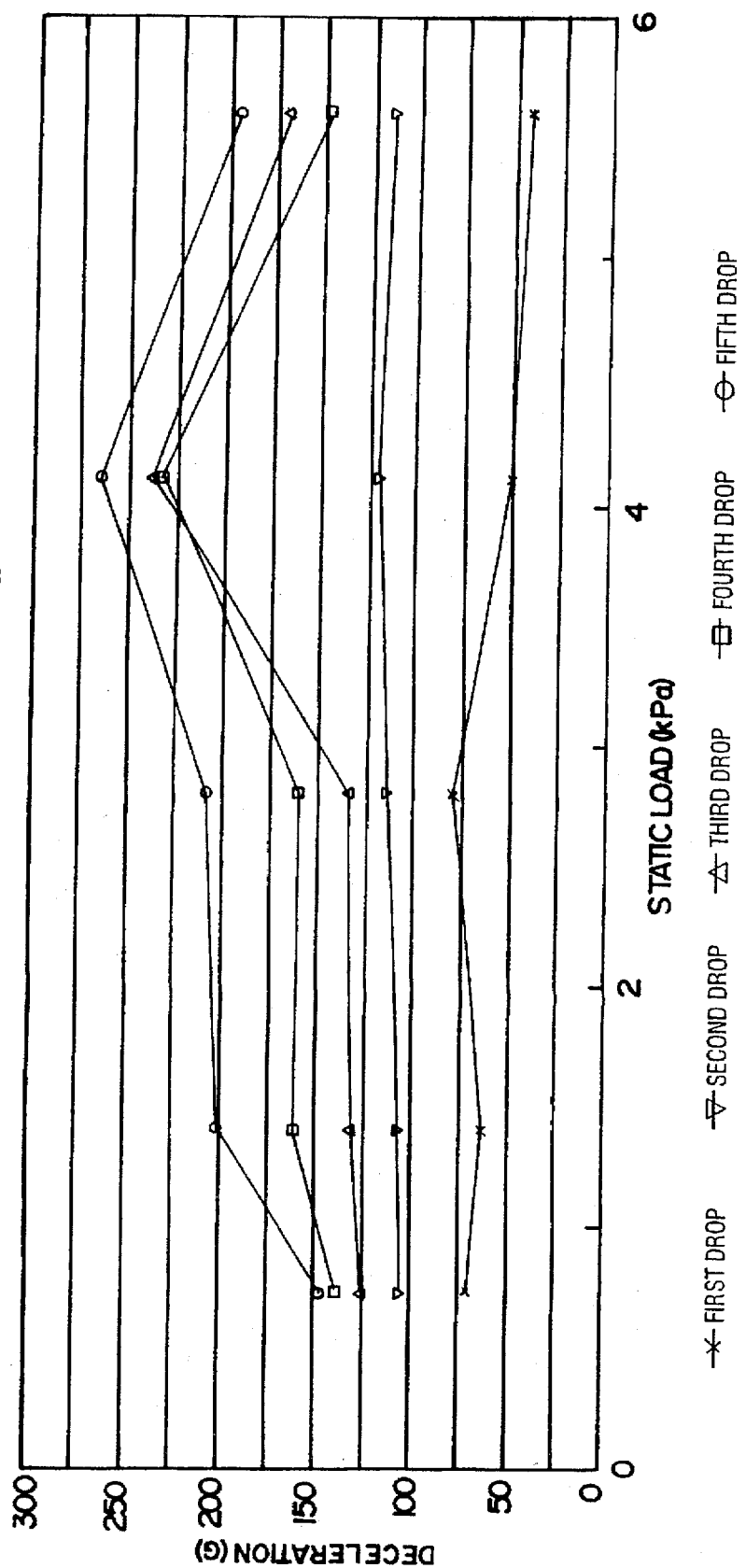

FIG. 6 through FIG. 8 show the results for a cushion thickness of 51 mm at 23° C., 50% RH for 61 cm, 76 cm and 91 cm drop heights respectively.

Figure 9:
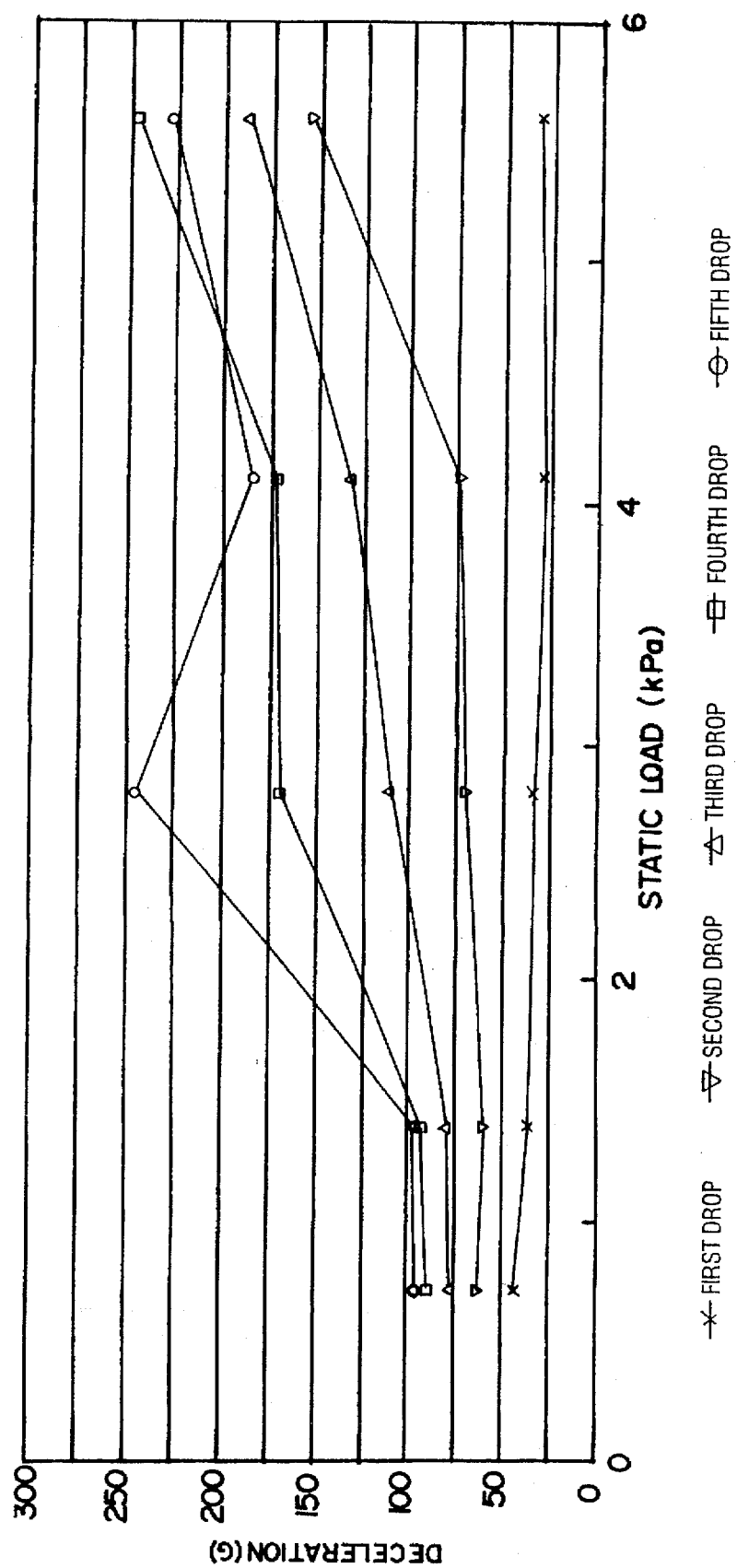
FIGS. 9 to 11 show the results for a cushion thickness of 51 mm at 23°, 92% relative humidity for 61 cm, 76 cm and 91 cm drop heights respectively.
Figure 10:
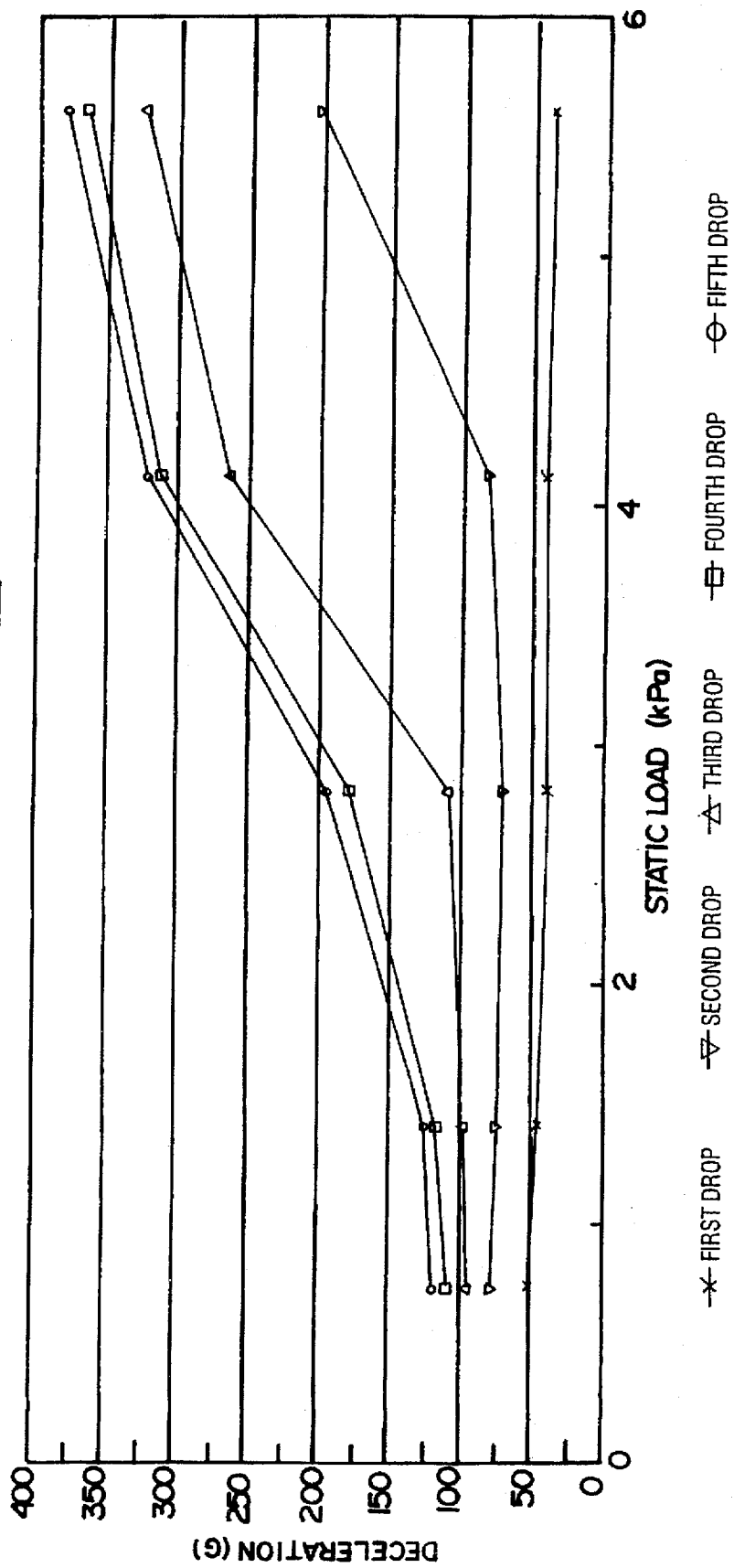
Figure 11:
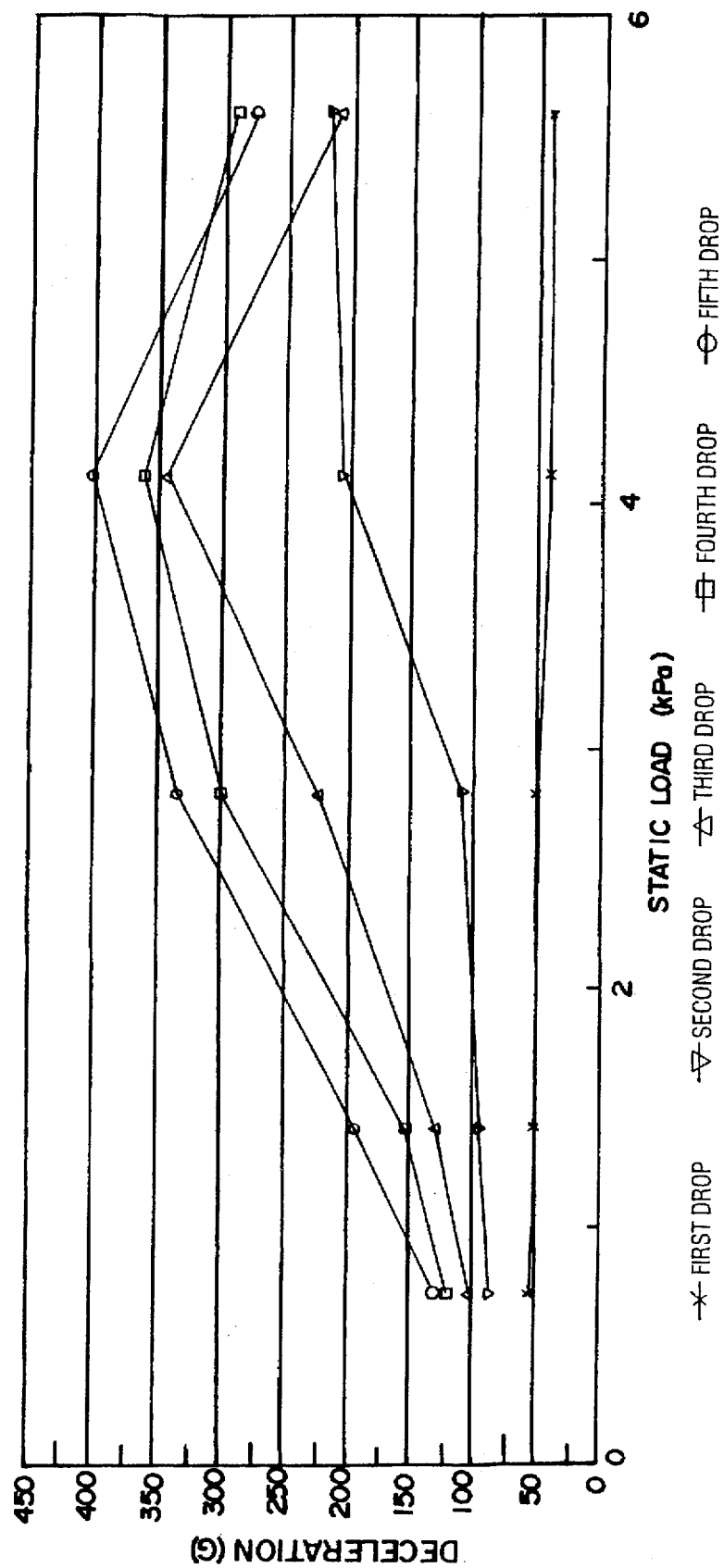

Similarly, FIG. 9 through FIG. 11 show the results for a cushion thickness of 51 mm at 23° C., 92% RH for 61 cm, 76 cm and 91 cm drop heights respectively.

Figure 12:
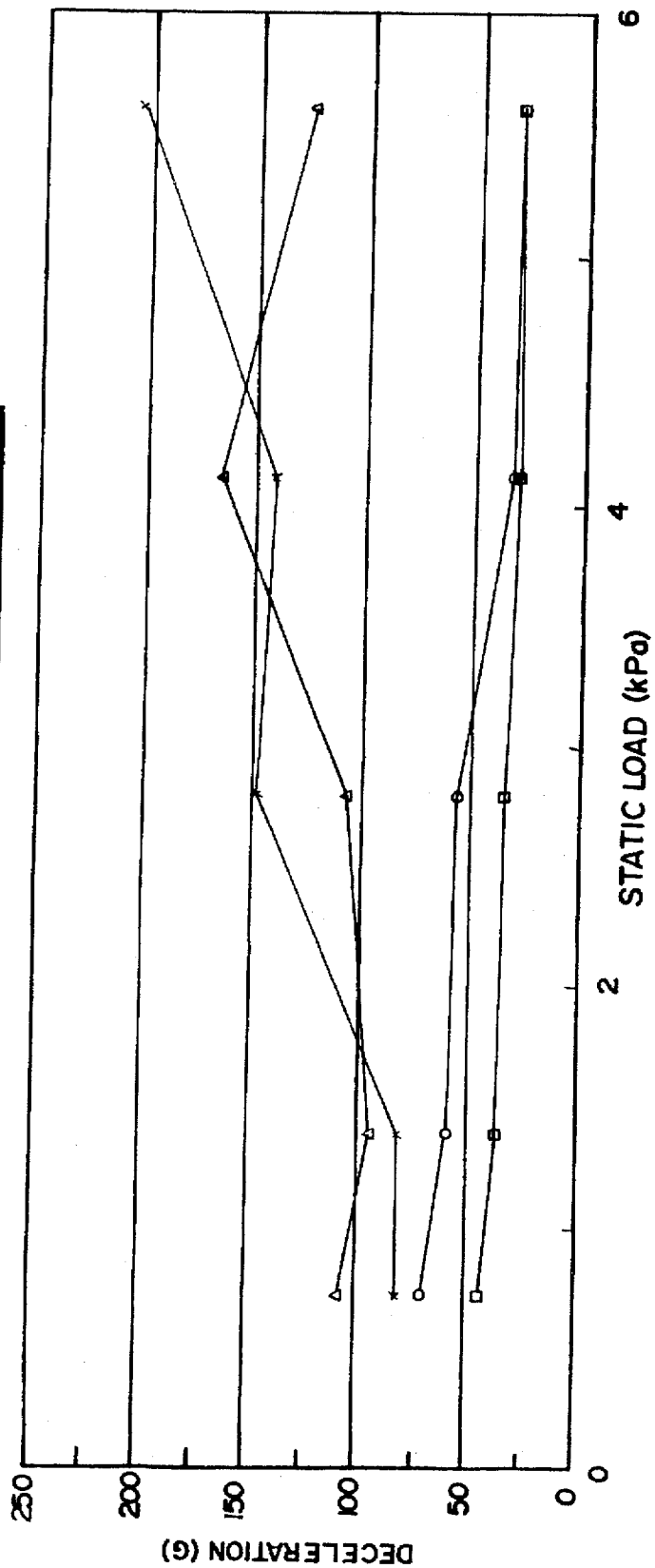
FIGS. 12 to 14 show cushion curves as they are traditionally found and reported by manufacturers of loose fill packaging material.
Figure 13:
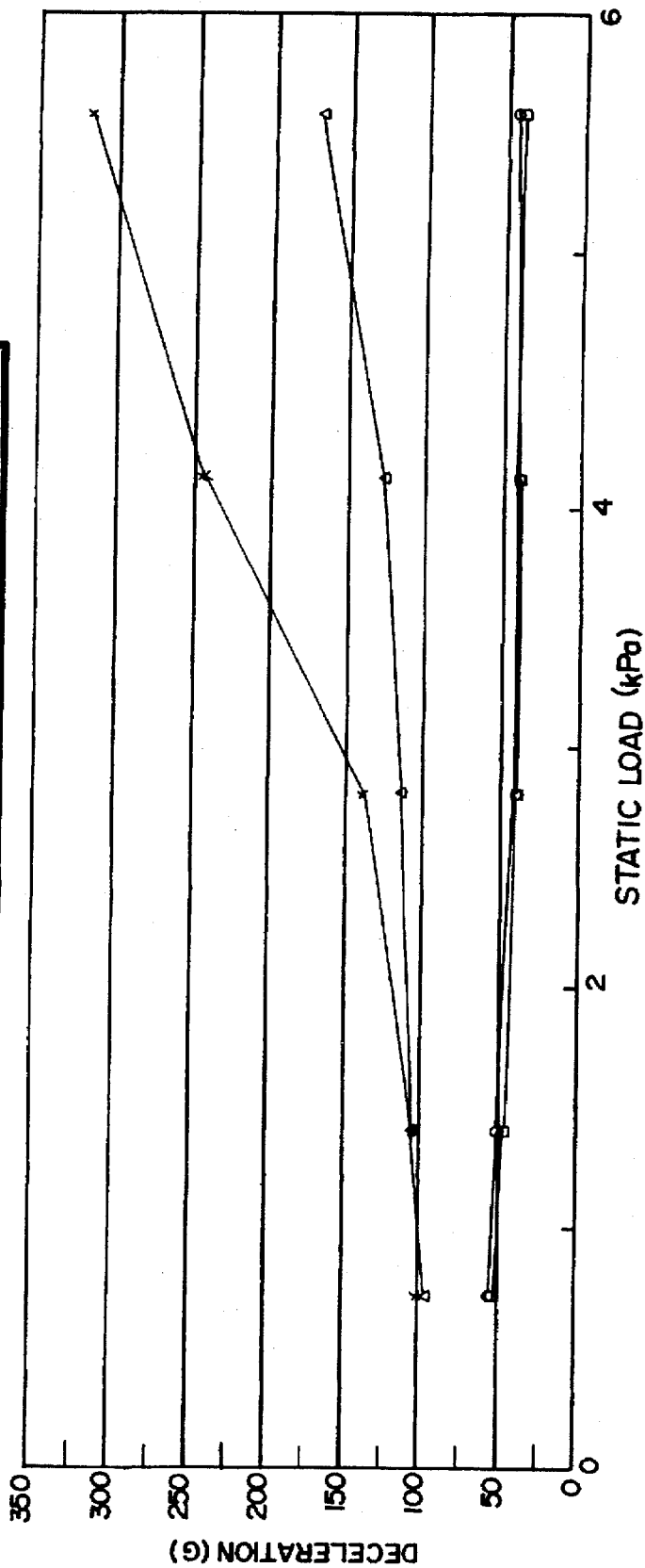
Figure 14:
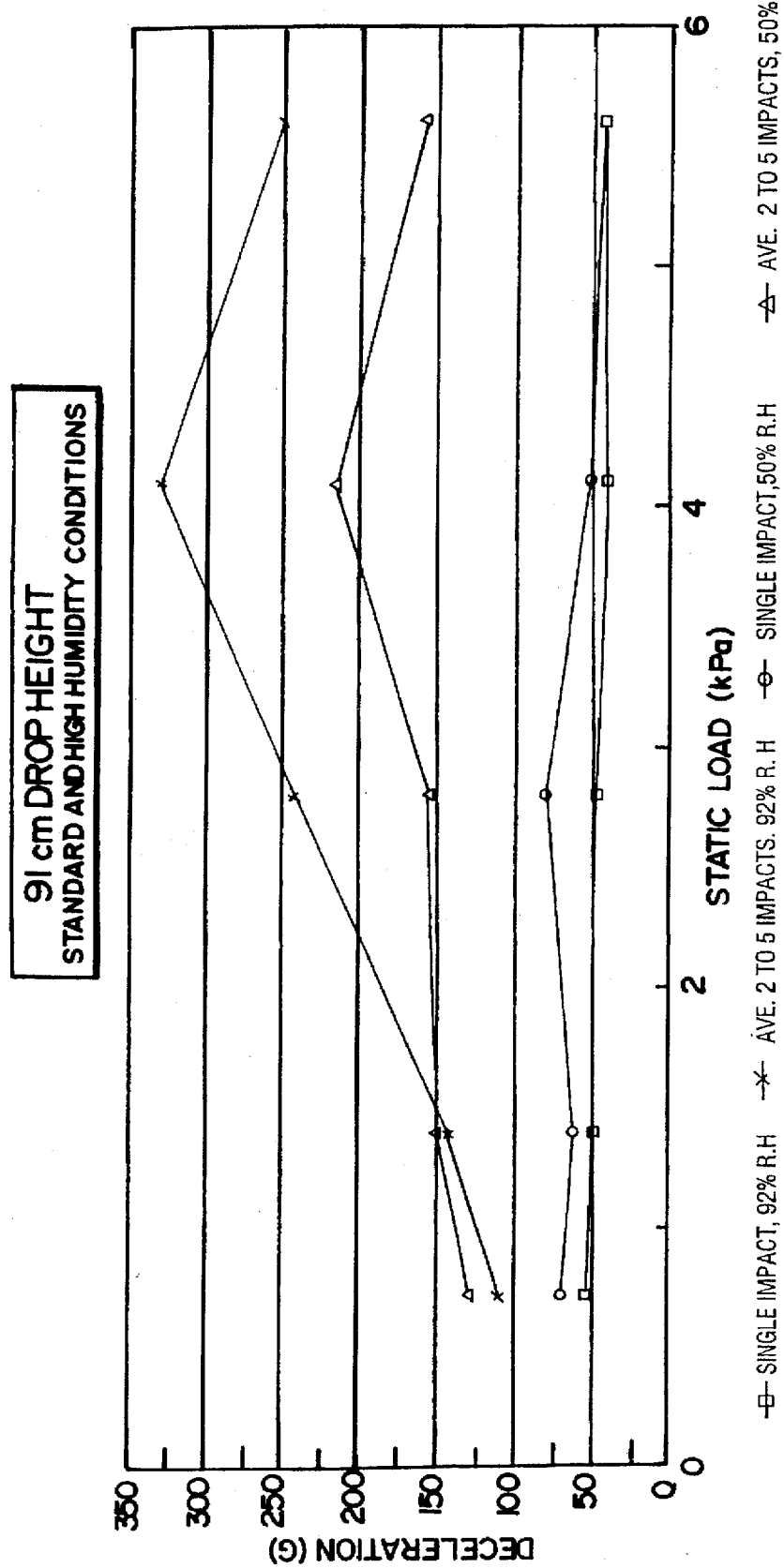

FIG. 12 through FIG. 14 show the cushion curves as they are traditionally found and reported by cushion manufacturers. Single impacts and an average of two of five impacts are shown for both standard and high humidity conditions.

An important point to consider is the effectiveness of the loose fill packaging material to protect the product by means of absorbing the shock experienced on impact of the complete package. This may be easily done by comparing the values of the transmitted shock to the test jig with no packaging material, (other than the cushioning the carton itself provides, but as this is present in all cases, its contribution can be ignored) in Table 1 to the corresponding cases with packaging material. The corresponding values may be found in FIGS. 6 and 8 respectively. For example, comparing the values for the 2.81 kPa static load, 61 cm drop height, 90% RH, and single drop, one sees the shock transmitted is reduced from 326 G's to 35 G's, a factor of 9.4 times.

The corresponding reduction factor for the 91 cm drop height is 4.9 times. Both these reduction factors, 9.4 and 4.9 imply a significant reduction in transmitted shock.

A comparison between the cushion curves shown in FIG. 6 and FIG. 9 (61 cm drop heights and standard and high humidity conditions respectively) shows that, in general, the lower relative humidity delivers the higher acceleration for single impacts. This is true for the entire range of static loadings for single and multiple impacts. This can be understood in terms of the corrugated material being harder, due to lower moisture levels, offering greater resistance to crushing at the moment of impact.

Conversely, at higher humidities and increasing static loadings as shown in FIG. 10 and FIG. 11 being for the 61 cm drop and 19 cm drop at 92% RH, the accelerations transmitted to the product increase dramatically when compared to the corresponding curves shown in FIG. 8 and FIG. 9. This is due to the packaging material softening and offering less resistance to buckling and crushing at the moment of impact.

What is apparent from the results shown in FIG. 7 through to FIG. 11, is the relative flatness of the cushion curve for the single impact and the areas of the second impact curve below static loadings of approximately 4.14 kPa. It would appear that the deformation of packaging material is below the yield point of total crushing of the flute. There is a permanent offset in the overall height of the packaging material, but there is considerable cushion thickness remaining which is able to deform plastically. Thus, plastic deformation is more apparent in the curves of higher humidity as the range of acceleration values are much greater due to the earlier crushing of the flutes and the properties being less elastic than those of lower humidity.

Tables 2 and 3 compare the peak accelerations for the same conditions of the corrugated loose fill and "Pelaspan-Pac Free-Flow™" an expanded polystyrene loose fill manufactured by the Dow Chemical Co. Ltd. It is apparent from the tables that the packaging of the invention offers superior cushioning performance over the entire static load range tested for the first impact, and comparable performance up to 2 kPa and superior performance beyond 2 kPa for the second impact. For the third impact the polystyrene free flow shows better protection at static loadings between 1 and 2 kPa, but corrugated loose fill packaging material shows the lowest transmitted G in the range 3 to 4 kPa. This shows that the corrugated loose fill packaging material has a tendency to offer better protection for the high static loadings, if the number of impacts does not exceed three. The performance of the expanded styrene material becomes equal to and then exceeds that of the corrugated loose fill packaging material, at the four and five successive drop points.

TABLE 2

Peak accelerations for corrugated loose-fill packaging material at 23° C., 50% R.H., 76 cm drop height, 51 mm thick cushion

| Static Load (Pa) | Drop 1 (Peak Gs) | Drop 2 (Peak Gs) | Drop 3 (Peak Gs) | Drop 4 (Peak Gs) | Drop 5 (Peak Gs) |
|---|---|---|---|---|---|
| 0.73 | 54 | 75 | 91 | 101 | 113 |
| 1.4 | 51 | 77 | 97 | 115 | 129 |
| 2.81 | 40 | 60 | 83 | 130 | 117 |
| 4.11 | 39 | 50 | 107 | 163 | 188 |
| 5.69 | 44 | 135 | 181 | 189 | 166 |

TABLE 3

Peak accelerations for "Pelaspan-Pac Free Flow ™" at 23° C., 50% R.H., 76 cm drop height, 51 mm thick cushion

| Static Load (Pa) | Drop 1 (Peak Gs) | Drop 2 (Peak Gs) | Drop 3 (Peak Gs) | Drop 4 (Peak Gs) | Drop 5 (Peak Gs) |
|---|---|---|---|---|---|
| 0.25 | 92 | 100 | 100 | 98 | 96 |
| 0.52 | 88 | 85 | 102 | 108 | 98 |

TABLE 3-continued

Peak accelerations for "Pelaspan-Pac Free Flow ™" at 23° C., 50% R.H., 76 cm drop height, 51 mm thick cushion

| Static Load (Pa) | Drop 1 (Peak Gs) | Drop 2 (Peak Gs) | Drop 3 (Peak Gs) | Drop 4 (Peak Gs) | Drop 5 (Peak Gs) |
| --- | --- | --- | --- | --- | --- |
| 1.03 | 57 | 74 | 78 | 84 | 85 |
| 2.07 | 52 | 73 | 82 | 86 | 93 |
| 3.38 | 63 | 90 | 110 | 120 | 132 |
| 4.28 | 57 | 96 | 116 | 138 | 140 |
| 6.48 | 77 | 164 | 202 | 232 | 260 |

The elements which comprise the packaging material, of the invention can readily be recycled and may be made from virgin or recycled material. The fibreboard material from which the packaging material is made readily absorbs liquids and provides for absorption of any spills which might otherwise damage the or adjacent outer containers.

What is claimed is:

1. A method of making loose fill packaging material consisting of a plurality of discrete loose fill packaging elements, the method comprising the steps of providing a sheet of fibrous material having a liner with a corrugated medium on opposite faces of said liner, cutting the sheet into strips, and then cutting the discrete packaging elements from the strips.

2. The method of claim 1 wherein said sheet comprises two sheets of single faced corrugated material, each sheet having a liner and a corrugated medium, and wherein the liners are secured together with their respective corrugated mediums facing outward.

3. The method of claim 1 wherein the sheet is made from single faced corrugated material having a liner with a corrugated medium bonded to one face of said liner, wherein the sheet is folded over onto itself, with the liner bonded to itself.

4. The method of claim 3 wherein the corrugated medium is an A, B or C flute corrugated medium.

5. The method of claim 1 wherein each said corrugated medium is either an A, B or C flute corrugated medium.

6. The method of claim 2 wherein each said corrugated medium is either an A, B or C flute corrugated medium.

7. The method of claim 1 wherein said discrete packaging elements are parallelepiped in shape.

8. The method of claim 1 wherein the liner and the corrugated medium are made from 115 gsm fibreboard material.

9. The method of claim 2 wherein each said liner and each said medium is made from 115 gsm fibreboard material.

10. The method of claim 3 wherein the liner and the corrugated medium are made from 115 gsm fibreboard material.

11. The method of claim 1 wherein said discrete packaging elements have a length of about 53 mm and a width of about 22 mm.

12. A method of packaging one or more articles in a container comprising placing discrete loose fill packaging elements within the container, each of said loose fill packaging elements consisting of a liner of fibrous material having a corrugated fibrous material medium secured to opposite faces of said liner, the elements extending to a predetermined level within the container; placing the or each article into the container; and filling the container with randomly placed additional said elements and sealing the container.

\* \* \* \* \*